(No Model.)

A. LYON.
PAWL AND RATCHET MECHANISM FOR CHAIN PUMPS.

No. 307,723. Patented Nov. 4, 1884.

Attest:
A. P. Knight
Geo. L. Wheelock

Inventor:
Arthur Lyon
By Knight Bros.
Attys.

United States Patent Office.

ARTHUR LYON, OF LOVELAND, OHIO, ASSIGNOR TO LYON & BROCK, OF SAME PLACE.

PAWL-AND-RATCHET MECHANISM FOR CHAIN-PUMPS.

SPECIFICATION forming part of Letters Patent No. 307,723, dated November 4, 1884.

Application filed February 13, 1884. (No model.)

*To all whom it may concern:*

Be it known that I, ARTHUR LYON, of Loveland, Clermont county, Ohio, have invented a new and useful Improvement in Chain-Pumps, of which the following is a specification.

The invention relates, principally, to the pawl-and-ratchet mechanism of a chain-pump; and it consists, essentially, of two gravitating pawls, of which, when one pawl is engaged in a tooth of the ratchet-wheel, the situation of the other pawl is always midway between two teeth, so that the chain can never move more than half-tooth distance in its retrograde movement, which, being thus promptly arrested, is prevented from acquiring such momentum as to snap the chain, or to strip the ratchet-teeth, or to fracture or dislodge one or more of the working parts. Each pawl has a straight shank, which is retained and guided in a vertical path by projections from the journal-plate, which plate also serves to prevent lateral displacement of the ratchet mechanism.

Figure 1:
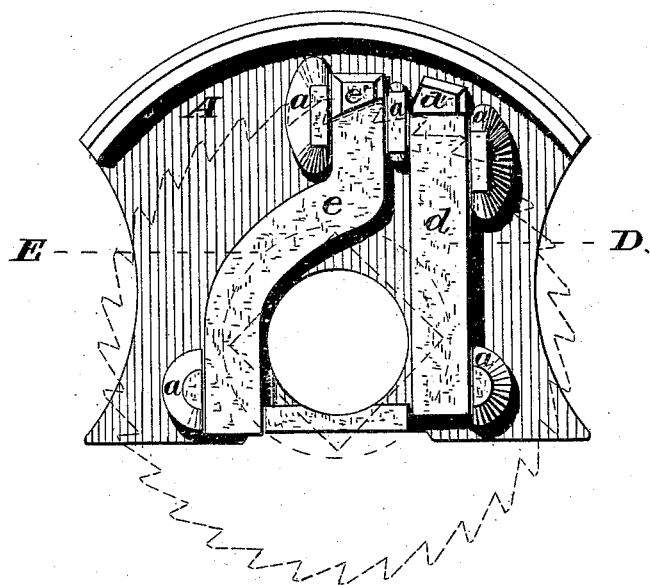
Figure 2:
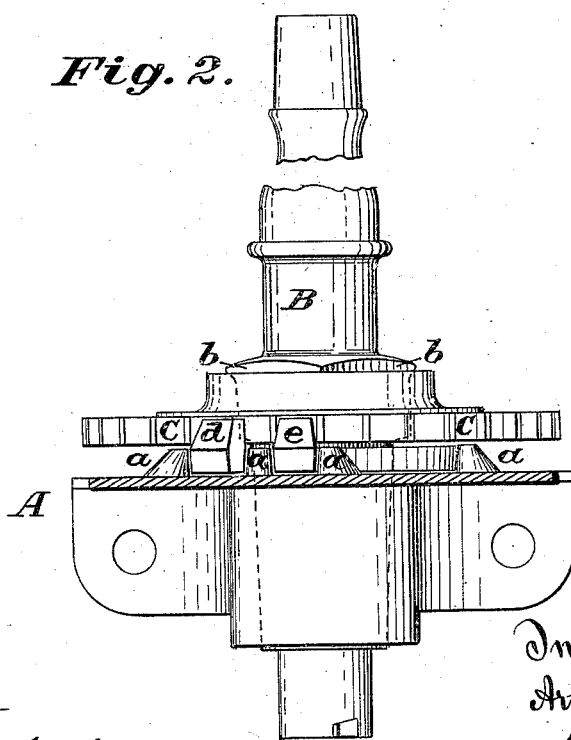

In the accompanying drawings, Figure 1 is a rear elevation of the journal-plate of a chain-pump embodying my invention, the pawls being shown in the positions they respectively assume when one has engaged with a tooth and the other is midway between two consecutive teeth of the ratchet-wheel, whose position is represented by dotted line. Fig. 2 is a partially-sectional top view of the same parts with the addition of the ratchet-wheel and part of the shaft.

A represents the journal-plate for the front journal of represented or any customary or suitable shaft, B.

C represents a customary ratchet-wheel. Lugs $a$ on rear wall of plate A serve, in association with the said shaft, to retain and guide to vertical paths the shanks $d\ e$ of two pawls, D E, of which one shank, $d$, is straight and the other curved in part, so that while their heads $d'\ e'$ are brought near to one another their shanks $d\ e$ embrace remote sides of the shaft B, in the manner shown.

The described parts are designed for use with customary hydraulic chain sprocket-wheel, winch, &c. (Not here shown.) Lateral displacement rearward of the ratchet-wheel is prevented by collar $b$ on the shaft, and frontward by the wall of the journal plate A. Lateral edgewise displacement of the pawls is prevented by the aforesaid lugs $a$ and the operating-shaft B, and sidewise by the ratchet-wheel and the wall of the journal-plate.

The arrangement of the above parts is such that while one pawl is engaging a ratchet-tooth the other pawl is midway between two consecutive teeth, and vice versa.

I claim as new and of my invention—

In a chain-pump fixture, the combination of front journal-plate, A, having the guide-lugs $a$, shaft B, having the collar $b$, ratchet-wheel C, and the pawls D E, constructed and operating as set forth.

In testimony of which invention I hereunto set my hand.

ARTHUR LYON.

Attest:
 GEO. H. KNIGHT,
 S. S. CARPENTER.